US009466205B2

(12) United States Patent
Ghazarian

(10) Patent No.: US 9,466,205 B2
(45) Date of Patent: Oct. 11, 2016

(54) IMPACT SENSING MOBILE COMMUNICATION APPARATUS

(71) Applicant: Ohanes D. Ghazarian, Henderson, NV (US)

(72) Inventor: Ohanes D. Ghazarian, Henderson, NV (US)

(*) Notice: Subject to any disclaimer, the term of this patent is extended or adjusted under 35 U.S.C. 154(b) by 0 days.

(21) Appl. No.: 14/544,788

(22) Filed: Feb. 17, 2015

(65) Prior Publication Data

US 2016/0240073 A1    Aug. 18, 2016

(51) Int. Cl.
  *G08B 25/01* (2006.01)
  *H04W 4/22* (2009.01)
  *H04W 4/02* (2009.01)

(52) U.S. Cl.
  CPC ............. *G08B 25/016* (2013.01); *H04W 4/02* (2013.01); *H04W 4/22* (2013.01)

(58) Field of Classification Search
  CPC .................... H04M 1/72538; H04M 2250/10; H04M 2250/12
  USPC ...................................... 455/404.2
  See application file for complete search history.

(56) References Cited

U.S. PATENT DOCUMENTS

| | | | |
|---|---|---|---|
| 7,308,272 B1 | 12/2007 | Wortham | |
| 8,849,239 B2 * | 9/2014 | Ghazarian | H04M 1/72538 455/404.2 |
| 2004/0036261 A1 * | 2/2004 | Breed | B60C 11/24 280/735 |
| 2005/0153680 A1 | 7/2005 | Yoshioka et al. | |
| 2006/0201964 A1 | 9/2006 | DiPerna et al. | |
| 2006/0241521 A1 * | 10/2006 | Cohen | A61B 5/0002 600/595 |
| 2007/0102527 A1 | 5/2007 | Eubank et al. | |
| 2008/0070546 A1 | 3/2008 | Lee | |
| 2008/0125078 A1 | 5/2008 | Morimoto | |
| 2009/0264093 A1 | 10/2009 | Rothschild | |

* cited by examiner

*Primary Examiner* — Michael Neff
(74) *Attorney, Agent, or Firm* — LeonardPatel PC

(57) ABSTRACT

Impact detection mobile communication apparatus comprises; a portable wireless communication apparatus attached to or carried on by a person containing, a processor, an impact detection sensor used for detecting user bodily impact condition, a built-in positioning locator receiver used to determine the apparatus location, a cellular RF transceiver used for receiving cellular tower Doppler signals to determine the apparatus movement velocity, and a speaker and a microphone used for user two way voice communication through a cellular network with a monitoring station.

The mobile communication apparatus processor in response to received user bodily impact condition signal, transmits a signal containing information to the apparatus ID, impact condition information and detected velocity, along with positioning location information to a monitoring station through the wireless communication network, and opens two way voice communication link between the communication apparatus user and a monitoring station operator, the operator based on received signals dispatch rescue personnel to the user location.

13 Claims, 2 Drawing Sheets

Block Diagram

Block Diagram

IMPACT SENSING MOBILE COMMUNICATION APPARATUS

REFERENCES CITED

Referenced by Applicant

U.S. Patent Documents

| | | |
|---|---|---|
| 7,308,272 | December 2007 | Wortham |
| 2005/0153680 | July 2005 | Yoshioka et al. |
| 2006/0201964 | September 2006 | DiPerna et al. |
| 2007/0102527 | May 2007 | Eubank et al. |
| 2008/0070546 | March 2008 | Lee |
| 2008/0125078 | May 2008 | Morimoto |
| 2009/0264093 | October 2009 | Rothschild |
| 8,849,239 | September 2014 | Ghazarian |

PARENT CASE TEXT

This application benefits U.S. provisional application No. 62/071,921 filed on Oct. 6, 2014

DESCRIPTION

Background of the Invention

Presently motor vehicles are built with impact detection sensors which are commonly used to deploy air bags during a vehicle accident, some of the present vehicles additionally are equipped with a GPS locator device having two way wireless voice communication system connected to vehicle's impact detection sensors, which upon detection of an impact the vehicle mount GPS unit transmits a signal through wireless network to a monitoring station containing GPS location information of the vehicle involved in collision and opens two way voice communication between the driver or occupant(s) of the vehicle, and a monitoring station personnel. After confirmation the monitoring station personnel dispatch's emergency assistance personnel for rescue, such well known system known as GM "On Star".

Unfortunately the teaching found in prior arts has it's limitation in use, as it is only useful in a vehicles wherein the system is installed, thus its use is good only for the driver and occupants of a particular vehicle where the impact detection system and the GPS communication devices is installed in. As for all other vehicles such as cars, motorcycles, public transport, water or snow mobiles, may not contain such system, and in particularly when a person is skiing or running will not be able to carry the vehicle with the GPS impact detection sensor on them. There for the a person cannot get the use and benefits of the art.

Contrary to the teachings found in the present invention, wherein the impact detection mobile communication device is carried on, wearable, or attached to the person, there for is useful where ever the person may travel, thus providing no limit of its use regardless if the person is driving or a passenger traveling in any vehicle, or riding a motorcycle, a boat, skiing, running, or is a passenger on public transport system wherein when such vehicles are not equipped with any sort of impact detection and reporting system. The present invention impact detection mobile communication device provides automatic emergency assistance in all sort of user bodily impact condition, including when the person is running, or accidentally falls.

It is accordingly the primary objective of the present invention to provide a portable wireless communication apparatus attached to or carried on by a person, containing a processor, an impact detection sensor used to detect user bodily impact condition, a positioning locator receiver used to coordinate the apparatus location, a microphone and a speaker used for two way voice communication between the user and a monitoring station, a cellular transceiver used to receive cellular tower Doppler signals to determine the apparatus velocity, and is used for establishing data and voice communication with a monitoring station, through a cellular network or other radio frequency communication network. The present invention apparatus processor is configured to detect user bodily impact condition such as when the user gets involve in an physical impact condition such as a vehicle accident. The apparatus wirelessly transmits the detected impact condition, the apparatus velocity, along with the apparatus location information to a monitoring station, and open two way voice between the user and a monitoring station operator, for the operator based on the received information dispatch rescue personnel to the apparatus user location, for assistance.

It is another objective of the present invention to provide an impact detection wireless communication apparatus attached to or carried on by a person such as a mobile phone, a wrist phone, or a carry on personal emergency assistance device known as PERS, which contains an Impact sensor used to detect user bodily impact condition, and utilizes cell phone tower received Doppler signals to determine the communication apparatus user bodily movement velocity, and utilizes cell phone tower received triangulation signals to determine the communication apparatus location, and accordingly sends the user bodily detected impact condition, the velocity and the location information of the apparatus to a monitoring station, and establish two way voice communication between the communication apparatus user and the monitoring station.

It is another objective of the present invention impact detection apparatus additionally to include a camera, wherein when the mobile communication apparatus processor detects an impact condition, the apparatus processor captures at list one video image of the impact condition, and transmits at least one signal containing the apparatus received cell tower Doppler signal velocity, the apparatus received location information and sends captured video image(s) to the monitoring station to provide impact condition information and the captured visual information to the monitoring station operator.

It is another objective of the present invention wherein the monitoring station may transmit RF signals through a communication network to wirelessly control the communication apparatus camera functions to obtain desired video images for the monitoring station operator.

And it is further objective of the present invention for the impact detection mobile communication apparatus processor to utilize cellular or RF communication network tower's received triangulated signals, to ascertain the apparatus obtain location coordinate wherein when the apparatus is located in tunnels or in buildings, whereas there are no GPS satellite signals available for the apparatus to determine the positioning location of the apparatus.

And it is further objective of the present invention impact detection mobile communication apparatus processor to utilizes cellular or RF communication network towers received Doppler signals, to ascertain the apparatus to detect the persons bodily movement speed in a tunnels or in building, wherein no GPS satellite signals could be received to determine the communication apparatus speed.

SUMMARY OF THE INVENTION

Positioning locator impact detection mobile communication apparatus attached to or carried on by a person, wherein when the person carrying the device gets into an bodily impact condition such as in a vehicle accident, or a person running falls or skiing hit a tree, etc. the person carrying the device may be driving a vehicle or may be a passenger in a moving vehicle. The present invention teaches a method wherein any person carrying the device is not limited to the use and benefits, such as the person carrying the impact detection apparatus may not be limited to being a driver or a passenger of a vehicle, the user could be a motorcycle driver or rider, a boat sailor or a boat passenger, a skier, or traveling in a public transportation system etc. the present invention teaching provides automatic user bodily impact condition and report the condition along with the location information of the user, and provides two way voice with a monitoring station for assistance.

The present invention teaching provides a portable wireless communication apparatus attached to or carried on by a person, containing a processor, an impact detection sensor, a positioning locator receiver, a microphone and a speaker, a cellular transceiver used to receive cellular tower Doppler signal to determine the apparatus velocity, and used for establishing data and voice communication with a monitoring station through a cellular network. The present invention apparatus processor is configured to detect user bodily impact condition such as when the user gets involve in a vehicle accident, and wirelessly transmit the apparatus detected impact condition, the apparatus velocity, along with the apparatus location information to a monitoring station and open two way voice between the apparatus user and a monitoring station operator, the operator based on the received information dispatch rescue personnel to the apparatus user location for assistance.

The present invention impact detection apparatus utilizes cell phone tower received Doppler signals to determine the apparatus user bodily movement velocity, and further may utilizes cell phone towers received triangulation signals to determine the apparatus location, and accordingly sends the user bodily detected impact condition signal, the velocity and the location information of the apparatus user to a monitoring station, and establish two way voice communication between the communication apparatus user and the monitoring station.

The present invention mobile communication apparatus additionally may contains a camera, the mobile communication apparatus processor upon detection of an impact condition, the device processor activates camera to capture at least one video image of the impact condition, and transmits at least one signal containing the apparatus received cell tower Doppler signal determined velocity, the apparatus received location information, and sends captured video image(s) to a monitoring station to provide impact condition information and visual information of the impact condition to a monitoring station operator.

The present invention monitoring station may transmit RF signals through a communication network to the impact detection apparatus processor to wirelessly control the mobile communication apparatus camera functions to obtain desired video images for the monitoring station operator to view.

DESCRIPTION OF THE DRAWINGS

These and other advantages of the present invention are best understood with reference to the drawings, in which.

DETAILED DESCRIPTION OF THE PREFERRED EMBODIMENT

Figure 1:
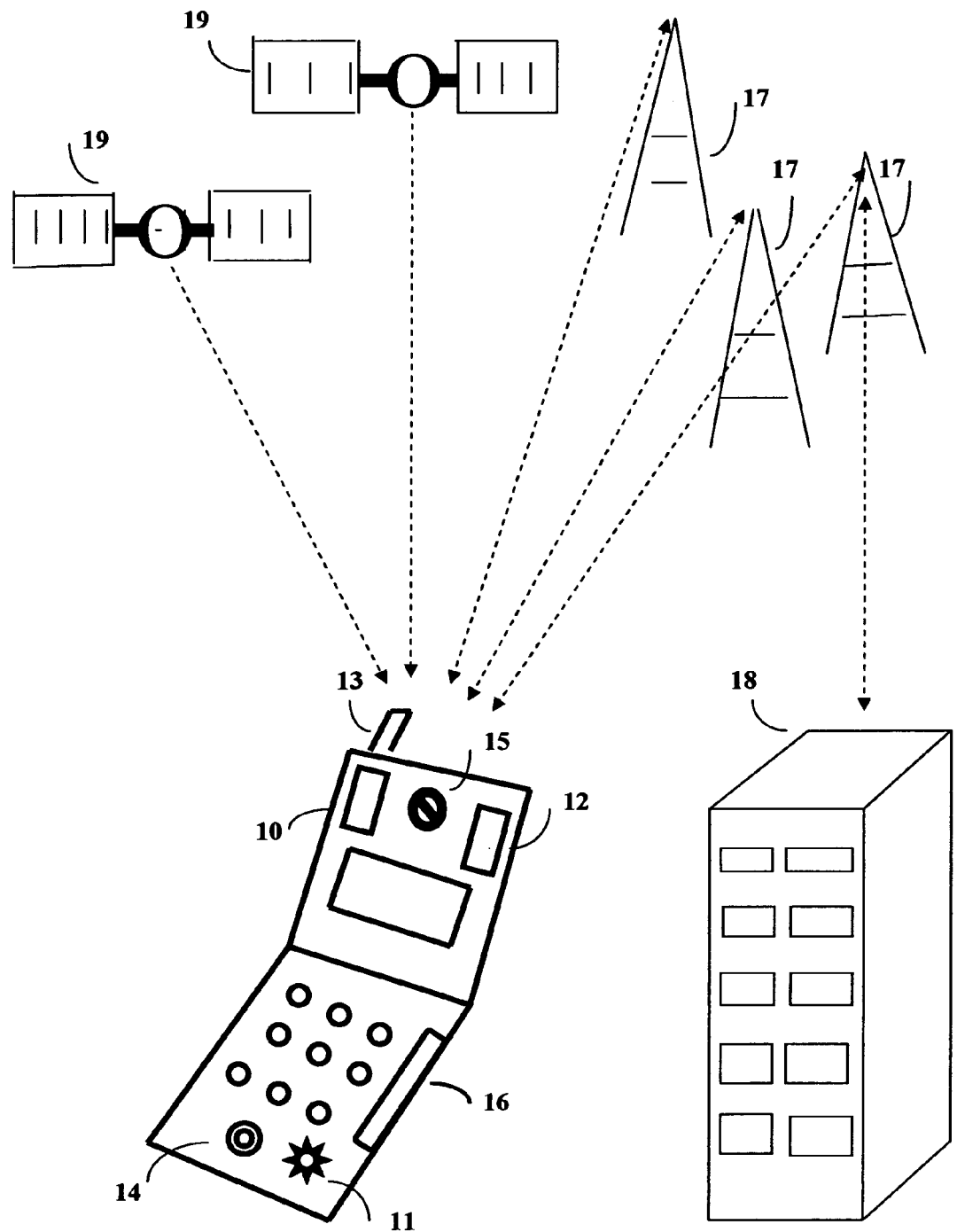
FIG. 1 Is a drawing of a mobile communication apparatus having an impact sensor, a positioning locator receiver receiving signals from GPS satellites, and a cellular transceiver used for receiving Doppler signals or triangulation signals from cellular towers, and used for establishing RF data and voice communication with a monitoring station.
Figure 2:
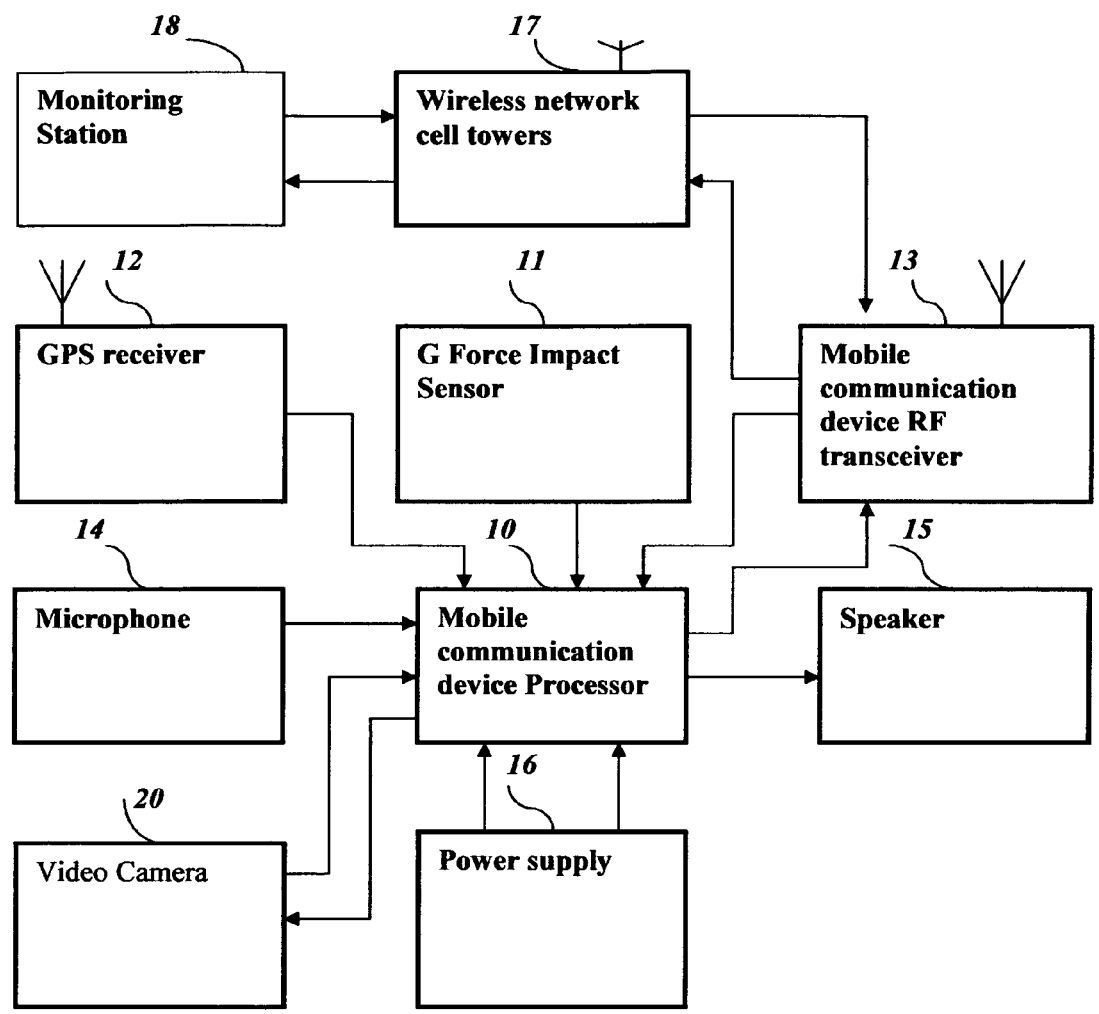
FIG. 2 Is a drawing of the present invention block diagram

Impact detection mobile communication device comprises;

a portable impact detection mobile communication apparatus FIGS. 1 and 2 attached to or carried on by a person, containing an G force impact detection sensor 11, such as an accelerometer, used for detecting user bodily impact condition and feed the detected impact condition signal to the mobile communication apparatus processor 10. The communication apparatus contains a GPS receiver 12 used for receiving GPS satellite 19 signals, and feed the received GPS co ordinance signals into the mobile communication apparatus processor 10. And a speaker 15, and a microphone 14, is utilized within the communication apparatus or externally used for the user to have two way voice communication with a monitoring station 18, or other secondary communication devices. And a cellular or RF transceiver 13 is used to receive cellular or RF communication tower 17 Doppler signals, for the processor 10 to determine the apparatus velocity, and the cellular or RF transceiver 13 is used for establishing wireless data communication such as transmitting the apparatus user location information. Also the cellular or RF transceiver 13 is used to establish audio communication between the apparatus user and a monitoring station 18. A battery 16 or other power means used to provide power for the impact detection mobile communication apparatus.

The impact detection mobile communication apparatus processor 10 in response to received bodily impact condition signal from the impact sensor 11, sends a signal to the mobile communication apparatus cellular or RF transceiver 13, to transmit a signal containing information to the mobile communication device ID 10, the impact condition G force 11 detection, along with the communication apparatus detected cell tower Doppler signal velocity, and received GPS 12 location information signals to a monitoring station 18 through a wireless communication network 17 means, and open two way voice communication between the mobile communication apparatus user and the monitoring station 18 operator. The monitoring station 18 operator based on received impact 11 condition signal, received velocity 13, 17 signal, and received GPS 12 location information signals determines the condition and accordingly dispatch's emergency personnel for assistance.

The mobile communication device processor 10 of present invention upon receipt of an impact condition signal from the impact sensor 11 the devise processor 10 opens automatic or monitoring station 18 controlled two way voice communication function between the apparatus user and monitoring station operator, for the operator to provide needed assistance to the communication apparatus user during a bodily impact condition.

Additionally the present invention teaching provides to monitoring station 18 operator to view the received impact condition signals 11, received cell tower Doppler signals 17, and received GPS co ordinance signals 19 to determine the received impact condition signals are of high velocity impact condition caused by high speed body impact or received impact condition signal are of very low or no velocity signals, accordingly the operator determines the user is involved in a hi speed accident or the user simply fell.

The mobile communication apparatus of the present invention instead of using received GPS 12 signal to determine the apparatus location, or in addition to using GPS receiver received satellite signals 19 to determine the apparatus location, further it may be configured to utilize the cellular towers 17 received triangulated signals for the apparatus processor 10 to determine the positioning location information of the impact detection apparatus, and accordingly send an impact detection signals to a monitoring station 18 through a wireless communication network 17, and opens two way voice communication between the communication apparatus user and the monitoring station 18 operator. Further the impact detection apparatus processor 10 may send the received cellular or RF communication tower 17 signals, or received communication tower 17 Doppler signals to a monitoring station 18, for the monitoring station PC to configure the received impact condition velocity or the apparatus user location.

The impact sensing mobile communication device of the present invention may contains a camera (FIG. 2), said mobile communication apparatus upon detection of an impact 11 condition, the communication apparatus processor 10 activates the mobile communication device camera 20 and transmits captured video images to a monitoring station 18 to provide audio visual information to the monitoring station 18 operator. The monitoring station 18 may transmit RF signals to the mobile communication apparatus for wirelessly controlling the mobile communication apparatus camera function, and receive desired video images by the monitoring station 18 operator to able provide needed visual assistance.

The invention claimed is:

1. Positioning locator impact detection mobile communication apparatus, comprising:
   an impact detection wireless mobile communication apparatus attached to, or carried by, a person (user), wherein the impact detection wireless mobile communication apparatus comprises:
   a processor,
   an impact detection sensor configured to detect a bodily impact condition of the person and feed detected bodily impact condition signals to the processor,
   a global position system (GPS) receiver configured to receive GPS signals of the impact detection wireless mobile communication apparatus, and feed received GPS location co-ordinance signals to the processor, and
   a speaker and a microphone used in conjunction with the processor to provide two-way voice communication between the person and a monitoring station,
   a cellular or radio frequency (RF) transceiver configured to receive communication network tower Doppler shift signals and feed the received communication network tower Doppler shift signals to the processor to determine a velocity of the impact detection wireless mobile communication apparatus, wherein
   the cellular or RF transceiver is configured to establish wireless data and voice communication between the impact detection wireless mobile communication device and the monitoring station, and
   a power source configured to supply power to the impact detection wireless mobile communication apparatus, wherein
   the processor in response to receiving the bodily impact condition signal from the impact detection sensor, transmits at least one cellular or RF signal comprising information regarding an impact detection wireless mobile communication apparatus identifier (ID), an impact detection wireless mobile communication apparatus impact condition, an impact detection wireless mobile communication apparatus velocity, and impact detection wireless mobile apparatus positioning location co-ordinance information to the monitoring station via a wireless communication network, the at least one cellular or RF signal causes the monitoring station to open two-way voice link between the impact detection wireless mobile communication apparatus user and the monitoring station, and allows the monitoring station to dispatch needed assistance to a user location of the impact detection wireless mobile communication apparatus.

2. The positioning locator impact detection mobile communication apparatus of claim 1, wherein the processor in response to receiving the bodily impact condition signal, transmits the impact detection wireless mobile communication apparatus ID, transmits the impact detection wireless mobile communication apparatus ID and impact condition information, transmits the impact detection wireless mobile communication apparatus ID and the impact detection wireless mobile communication apparatus velocity, or transmits the impact detection wireless mobile communication apparatus ID and the impact detection wireless mobile communication apparatus positioning location co-ordinance information to the monitoring station via the cellular or wireless communication network, allowing the monitoring station to inquire the processor to send at least one impact condition velocity information, positioning location co-ordinance information of the impact detection wireless mobile communication apparatus, or both, to the monitoring station, for the monitoring station to dispatch rescue personnel to the user location of the impact detection wireless mobile communication device for assistance.

3. The positioning locator impact detection mobile communication apparatus of claim 1, wherein the processor upon detecting the bodily impact condition, is configured automatically to open two-way voice communication between the person and the monitoring station so an operator provides needed assistance.

4. The positioning locator impact detection mobile communication apparatus of claim 1, wherein the processor is configured to triangulate signals received from the cellular or RF communication network towers to determine positioning location of the impact detection wireless mobile communication apparatus.

5. The positioning locator impact detection mobile communication apparatus of claim 1, wherein the impact detection wireless mobile communication apparatus comprises a camera, the impact detection wireless mobile communication apparatus upon detecting the bodily impact condition causes the processor to transmit at least one signal comprising information related to the impact detection wireless mobile communication apparatus impact condition, and to activate the camera to transmit captured video images to the monitoring station, providing visual information to an operator of the monitoring station.

6. The positioning locator impact detection mobile communication apparatus of claim 5, wherein the monitoring station upon receipt of the bodily impact condition signal, transmits RF signals to the processor to wirelessly control functionality of the camera, providing desired video images to the operator of the monitoring station for visual assistance.

7. The positioning locator impact detection mobile communication apparatus of claim 1, wherein the impact detection wireless mobile communication apparatus uses a communication device cellular module received cell tower triangulated signals to determine the user location of the positioning locator impact detection mobile communication apparatus, and transmit the received cell tower triangulated signals via a cellular network to the monitoring station.

8. The positioning locator impact detection mobile communication apparatus of claim 1, wherein the processor is further configured to transmit high velocity impact detection signals or transmit medium velocity impact detection signals, or no velocity impact condition detection signals, and
the monitoring station operator based on the received user bodily impact condition signals determines the received user bodily impact signals are caused by a high velocity impact, low velocity impact, or no velocity impact, and opens two-way voice communication to assist the person of the impact detection wireless mobile communication apparatus.

9. A positioning locator impact detection mobile communication apparatus attached to, or carried by, a person (user), the positioning locator impact detection mobile communication apparatus comprising:
an impact detection sensor configured to detect user bodily impact condition and send information related to the detected bodily user impact condition to a monitoring station, wherein
the positioning locator impact detection mobile communication apparatus further comprises:
a processor connected to the impact detection sensor, and
a speaker and a microphone used in conjunction with the processor to provide two-way voice communication between the person and the monitoring station,
a cellular or radio frequency (RF) transceiver configured to receive a plurality of cellular or RF communication network tower signals causing the processor to triangulate the received plurality of cellular or RF communication network tower signals to determine the location of the positioning locator impact detection mobile communication apparatus, and is configured to receive cellular or RF tower Doppler shift signals causing the processor to determine a velocity of the positioning locator impact detection mobile communication apparatus, and establish wireless data and voice communication between the positioning locator impact detection mobile communication apparatus and the monitoring station,
a power source configured to supply power to the positioning locator impact detection mobile communication apparatus,
the processor in response to receiving the user bodily impact condition signal, transmits via a wireless communication network at least one identifiable RF signal comprising information related to a positioning locator impact detection mobile communication apparatus impact condition, a positioning locator impact detection mobile communication apparatus velocity, a positioning locator impact detection mobile communication apparatus location co-ordinance, and enable two-way voice communication between the person of the positioning locator impact detection mobile communication apparatus and the monitoring station.

10. The positioning locator impact detection mobile communication apparatus of claim 9, further comprising a camera, wherein
the positioning locator impact detection mobile communication apparatus, upon detection of an impact condition, causes the processor to transmit at least one signal comprising one or more captured video images to the monitoring station, providing visual information to an operator of the monitoring station.

11. A positioning locator impact detection mobile communication apparatus attached to, or carried by, a person (user), comprising:
an impact detection sensor configured to detect a user bodily impact condition, and send a detected user bodily impact condition signal and positioning location information of the positioning locator impact detection mobile communication apparatus to a monitoring station, the positioning locator impact detection mobile communication apparatus further comprising:
a processor connected to the impact detection sensor,
a speaker and a microphone used in conjunction with the processor to provide two-way voice communication between the person and the monitoring station,
a cellular or radio frequency (RF) transceiver configured to receive a plurality of cellular or RF communication network tower triangulated signals to determine a positioning locator mobile communication apparatus location, receive a plurality of cellular or RF communication network tower Doppler shift signals to determine a positioning locator mobile communication apparatus velocity, or both, and establish wireless data and voice communication between said the positioning locator impact detection mobile communication apparatus and the monitoring station,
a power source configured to supply power to the positioning locator impact detection mobile communication apparatus,
the processor in response to receiving the user bodily impact condition signal, transmits via a wireless communication network at least one identifiable RF signal comprising information related to a positioning locator impact detection mobile communication apparatus impact condition, the received plurality of cellular or RF communication network tower triangulated signals, the plurality of cellular or RF communication network tower Doppler shift signals, or both, to the monitoring station,
the monitoring station based on the received plurality of cellular or RF communication network tower triangulated signals, determines the location of the positioning locator impact detection mobile communication apparatus, or based on the plurality of cellular or RF communication network tower Doppler shift signals , determines a velocity of the positioning locator impact detection mobile communication apparatus, enables two-way voice communication between the person of the positioning locator impact detection mobile communication apparatus and the monitoring station, and dispatches emergency assistance to a user location of the positioning locator impact detection mobile communication apparatus.

12. The positioning locator impact detection mobile communication apparatus of claim 11, wherein the impact detection wireless mobile communication apparatus comprises a camera, the impact detection wireless mobile communication apparatus upon detection of an impact condition causes the processor to transmit at least one signal comprising one or more captured video images to the monitoring station, providing visual information to an operator of the monitoring station.

13. The positioning locator impact detection mobile communication apparatus of claim 11, wherein the impact detection wireless mobile communication apparatus, upon detection of an impact condition, causes the processor to transmit at least one signal to the monitoring station, allowing the monitoring station to transmit RF signals to the processor to wirelessly control functionality of a camera, providing desired video images to an operator of the monitoring station for visual assistance.

\* \* \* \* \*